United States Patent [19]
Wood, Jr. et al.

[11] Patent Number: 6,072,801
[45] Date of Patent: Jun. 6, 2000

[54] METHOD OF ADDRESSING MESSAGES, METHOD OF ESTABLISHING WIRELESS COMMUNICATIONS, AND COMMUNICATIONS SYSTEM

[75] Inventors: Clifton W. Wood, Jr., Boise, Id.; Don Hush, Tijeras, N.Mex.

[73] Assignee: Micron Technology, Inc., Boise, Id.

[21] Appl. No.: 09/026,045

[22] Filed: Feb. 19, 1998

[51] Int. Cl.[7] ................................ H04J 3/16; H04J 3/02; H04L 12/43
[52] U.S. Cl. ........................... 370/437; 370/458; 370/462
[58] Field of Search .................................. 370/447, 449, 370/437, 441, 442, 458, 462, 463

[56] References Cited

U.S. PATENT DOCUMENTS

| | | | |
|---|---|---|---|
| 4,075,632 | 2/1978 | Baldwin et al. | 343/6.8 |
| 4,862,453 | 8/1989 | West et al. | . |
| 4,926,182 | 5/1990 | Ohta et al. | 342/44 |
| 5,365,551 | 11/1994 | Snodgrass et al. | . |
| 5,479,416 | 12/1995 | Snodgrass et al. | . |
| 5,500,650 | 3/1996 | Snodgrass et al. | . |
| 5,583,850 | 12/1996 | Snodgrass et al. | . |
| 5,608,739 | 3/1997 | Snodgrass et al. | . |
| 5,621,412 | 4/1997 | Sharpe et al. | 342/51 |
| 5,625,628 | 4/1997 | Heath | . |
| 5,627,544 | 5/1997 | Snodgrass et al. | . |
| 5,649,296 | 7/1997 | MacLellan et al. | 455/38.2 |

FOREIGN PATENT DOCUMENTS

WO 97/48216  12/1997  WIPO  ........................ 12/56

*Primary Examiner*—Douglas W. Olms
*Assistant Examiner*—David R Vincent
*Attorney, Agent, or Firm*—Wells, St. John, Roberts, Gregory & Matkin, P.S.

[57] ABSTRACT

A method of establishing wireless communications between an interrogator and individual ones of multiple wireless identification devices, the method comprising utilizing a tree search method to establish communications without collision between the interrogator and individual ones of the multiple wireless identification devices, a search tree being defined for the tree search method, the tree having multiple levels representing subgroups of the multiple wireless identification devices, the number of devices in a subgroup in one level being half of the number of devices in the next higher level, the tree search method employing level skipping wherein at least one level of the tree is skipped. A communications system comprising an interrogator, and a plurality of wireless identification devices configured to communicate with the interrogator in a wireless fashion, the respective wireless identification devices having a unique identification number, the interrogator being configured to employ a tree search technique to determine the unique identification numbers of the different wireless identification devices so as to be able to establish communications between the interrogator and individual ones of the multiple wireless identification devices without collision by multiple wireless identification devices attempting to respond to the interrogator at the same time, wherein levels of the tree are occasionally skipped.

36 Claims, 3 Drawing Sheets

METHOD OF ADDRESSING MESSAGES, METHOD OF ESTABLISHING WIRELESS COMMUNICATIONS, AND COMMUNICATIONS SYSTEM

TECHNICAL FIELD

This invention relates to communications protocols and to digital data communications. Still more particularly, the invention relates to data communications protocols in mediums such as radio communication or the like. The invention also relates to radio frequency identification devices for inventory control, object monitoring, determining the existence, location or movement of objects, or for remote automated payment.

BACKGROUND OF THE INVENTION

Communications protocols are used in various applications. For example, communications protocols can be used in electronic identification systems. As large numbers of objects are moved in inventory, product manufacturing, and merchandising operations, there is a continuous challenge to accurately monitor the location and flow of objects. Additionally, there is a continuing goal to interrogate the location of objects in an inexpensive and streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another wireless electronic identification system utilizes a large active transponder device affixed to an object to be monitored which receives a signal from an interrogator. The device receives the signal, then generates and transmits a responsive signal. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Electronic identification systems can also be used for remote payment. For example, when a radio frequency identification device passes an interrogator at a toll booth, the toll booth can determine the identity of the radio frequency identification device, and thus of the owner of the device, and debit an account held by the owner for payment of toll or can receive a credit card number against which the toll can be charged. Similarly, remote payment is possible for a variety of other goods or services.

A communication system typically includes two transponders: a commander station or interrogator, and a responder station or transponder device which replies to the interrogator.

If the interrogator has prior knowledge of the identification number of a device which the interrogator is looking for, it can specify that a response is requested only from the device with that identification number. Sometimes, such information is not available. For example, there are occasions where the interrogator is attempting to determine which of multiple devices are within communication range.

When the interrogator sends a message to a transponder device requesting a reply, there is a possibility that multiple transponder devices will attempt to respond simultaneously, causing a collision, and thus causing an erroneous message to be received by the interrogator. For example, if the interrogator sends out a command requesting that all devices within a communications range identify themselves, and gets a large number of simultaneous replies, the interrogator may not be able to interpret any of these replies. Thus, arbitration schemes are employed to permit communications free of collisions.

In one arbitration scheme or system, described in commonly assigned U.S. Pat. Nos. 5,627,544; 5,583,850; 5,500, 650; and 5,365,551, all to Snodgrass et al. and all incorporated herein by reference, the interrogator sends a command causing each device of a potentially large number of responding devices to select a random number from a known range and use it as that device's arbitration number. By transmitting requests for identification to various subsets of the full range of arbitration numbers, and checking for an error-free response, the interrogator determines the arbitration number of every responder station capable of communicating at the same time. Therefore, the interrogator is able to s conduct subsequent uninterrupted communication with devices, one at a time, by addressing only one device.

Another arbitration scheme is referred to as the Aloha or slotted Aloha scheme. This scheme is discussed in various references relating to communications, such as *Digital Communications: Fundamentals and Applications,* Bernard Sklar, published January 1988 by Prentice Hall. In this type of scheme, a device will respond to an interrogator using one of many time domain slots selected randomly by the device. A problem with the Aloha scheme is that if there are many devices, or potentially many devices in the field (i.e. in communications range, capable of responding) then there must be many available slots or many collisions will occur. Having many available slots slows down replies. If the magnitude of the number of devices in a field is unknown, then many slots are needed. This results in the system slowing down significantly because the reply time equals the number of slots multiplied by the time period required for one reply.

An electronic identification system which can be used as a radio frequency identification device, arbitration schemes, and various applications for such devices are described in detail in commonly assigned U.S. patent application Ser. No. 08/705,043, filed Aug. 29, 1996, and incorporated herein by reference.

SUMMARY OF THE INVENTION

The invention provides a wireless identification device configured to provide a signal to identify the device in response to an interrogation signal.

Another aspect of the invention provides a method of establishing wireless communications between an interrogator and individual ones of multiple wireless identification devices. A tree search method is utilized to establish communications without collision between the interrogator and individual ones of the multiple wireless identification devices. A search tree is defined for the tree search method. The tree has multiple levels representing subgroups of the multiple wireless identification devices. The number of devices in a subgroup in one level is half of the number of devices in the next higher level. The tree search method employs level skipping wherein at least one level of the tree is skipped.

Another aspect of the invention provides a communications system comprising an interrogator, and a plurality of wireless identification devices configured to communicate with the interrogator in a wireless fashion. The respective wireless identification devices have a unique identification number. The interrogator is configured to employ a tree search technique to determine the unique identification numbers of the different wireless identification devices so as to be able to establish communications between the interrogator and individual ones of the multiple wireless identification devices without collision by multiple wireless identification devices attempting to respond to the interrogator at the same time. Levels of the tree are occasionally skipped.

One aspect of the invention provides a radio frequency identification device comprising an integrated circuit including a receiver, a transmitter, and a microprocessor. In one embodiment, the integrated circuit is a monolithic single die single metal layer integrated circuit including the receiver, the transmitter, and the microprocessor. The device of this embodiment includes an active transponder, instead of a transponder which relies on magnetic coupling for power, and therefore has a much greater range.

BRIEF DESCRIPTION OF THE DRAWINGS

Preferred embodiments of the invention are described below with reference to the following accompanying drawings.

FIG. 4 is a diagram illustrating a tree splitting sort method for establishing communication with a radio frequency identification device in a field of a plurality of such devices.

FIG. 5. is a diagram illustrating a modified tree splitting sort method for establishing communication with a radio frequency identification device in a field of a plurality of such devices.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
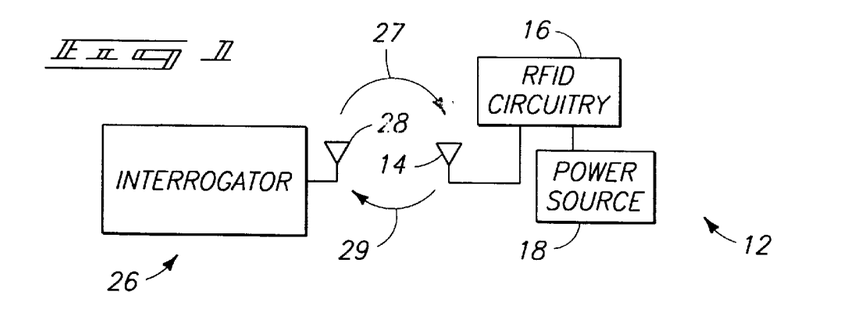
FIG. 1 is a high level circuit schematic showing an interrogator and a radio frequency identification device embodying the invention.

FIG. 1 illustrates a wireless identification device 12 in accordance with one embodiment of the invention. In the illustrated embodiment, the wireless identification device is a radio frequency data communication device 12, and includes RFID circuitry 16. In the illustrated embodiment, the RFID circuitry is defined by an integrated circuit as described in the above-incorporated patent application Ser. No. 08/705,043, filed Aug. 29, 1996. Other embodiments are possible. A power source 18 is connected to the integrated circuit 16 to supply power to the integrated circuit 16. In one embodiment, the power source 18 comprises a battery. The device 12 further includes at least one antenna 14 connected to the circuitry 16 for wireless or radio frequency transmission and reception by the circuitry 16.

The device 12 transmits and receives radio frequency communications to and from an interrogator 26. An exemplary interrogator is described in commonly assigned U.S. Patent Application Ser. No. 08/907,689, filed Aug. 8, 1997 and incorporated herein by reference. Preferably, the interrogator 26 includes an antenna 28, as well as dedicated transmitting and receiving circuitry, similar to that implemented on the integrated circuit 16.

Generally, the interrogator 26 transmits an interrogation signal or command 27 via the antenna 28. The device 12 receives the incoming interrogation signal via its antenna 14. Upon receiving the signal 27, the device 12 responds by generating and transmitting a responsive signal or reply 29. The responsive signal 29 typically includes information that uniquely identifies, or labels the particular device 12 that is transmitting, so as to identify any object or person with which the device 12 is associated.

Although only one device 12 is shown in FIG. 1, typically there i will be multiple devices 12 that correspond with the interrogator 26, and the particular devices 12 that are in communication with the interrogator 26 will typically change over time. In the illustrated embodiment in FIG. 1, there is no communication between multiple devices 12. Instead, the devices 12 respectively communicate with the interrogator 26. Multiple devices 12 can be used in the same field of an interrogator 26 (i.e., within communications range of an interrogator 26). Similarly, multiple interrogators 26 can be in proximity to one or more of the devices 12.

The radio frequency data communication device 12 can be included in any appropriate housing or packaging. Various methods of manufacturing housings are described in commonly assigned U.S. patent application Ser. No. 08/800,037, filed Feb. 13, 1997, and incorporated herein by reference.

Figure 2:
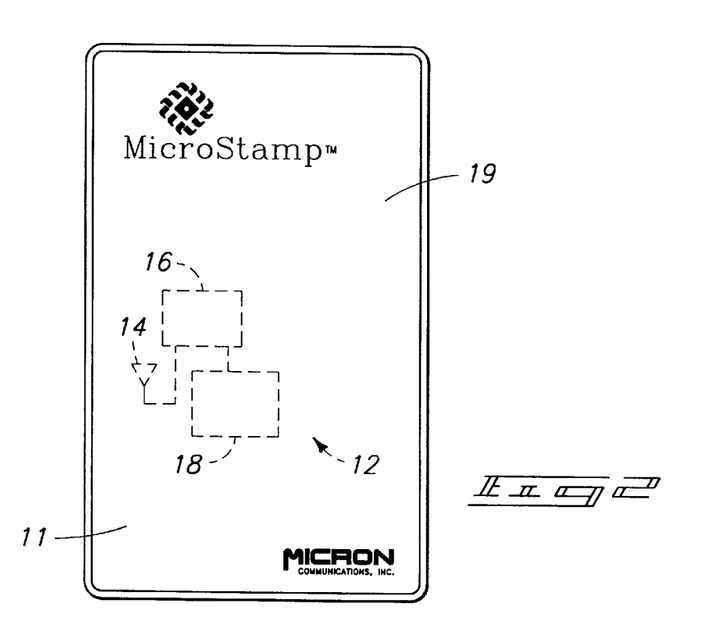
FIG. 2 is a front view of a housing, in the form of a badge or card, supporting the circuit of FIG. 1 according to one embodiment the invention.

FIG. 2 shows but one embodiment in the form of a card or badge 19 including the radio frequency data communication device 12, and a housing 11 including plastic or other suitable material. In one embodiment, the front face of the badge has visual identification features such as graphics, text, information found on identification or credit cards, etc.

Figure 3:
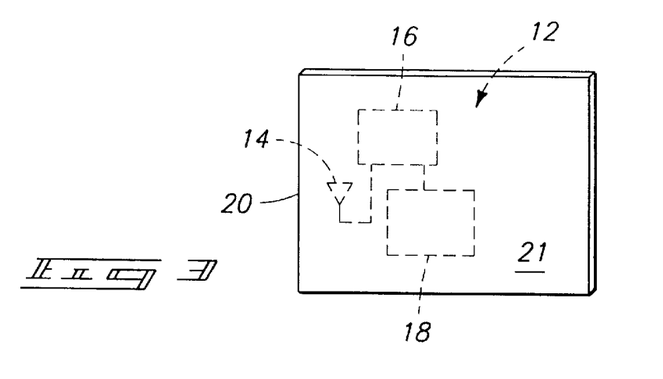
FIG. 3 is a front view of a housing supporting the circuit of FIG. 1 according to another embodiment of the invention.

FIG. 3 illustrates but one alternative housing supporting the device 12. More particularly, FIG. 3 shows a miniature housing 20 encasing the device 12 to define a tag which can be supported by an object (e.g., hung from an object, affixed to an object, etc.). Although two particular types of housings have been disclosed, the device 12 can be included in any appropriate housing.

If the power source 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the power source 18 comprises a series connected pair of button type cells. Instead of using a battery, any suitable power source can be employed.

The circuitry 16 further includes a backscatter transmitter and is configured to provide a responsive signal to the interrogator 26 by radio frequency. More particularly, the circuitry 16 includes a transmitter, a receiver, and memory such as is described in U.S. patent application Ser. No. 08/705,043.

Radio frequency identification has emerged as a viable and affordable alternative to tagging or labeling small to large quantities of items. The interrogator 26 communicates with the devices 12 via an RF link, so all transmissions by the interrogator 26 are heard simultaneously by all devices 12 within range.

If the interrogator 26 sends out a command requesting that all devices 12 within range identify themselves, and gets a large number of simultaneous replies, the interrogator 26 may not be able to interpret any of these replies. Therefore, arbitration schemes are provided.

If the interrogator 26 has prior knowledge of the identification number of a device 12 which the interrogator 26 is looking for, it can specify that a response is requested only from the device 12 with that identification number. To target a command at a specific device 12, (i.e., to initiate point-on-point communication), the interrogator 26 must send a number identifying a specific device 12 along with the command. At start-up, or in a new or changing environment, these identification numbers are not known by the interrogator 26. Therefore, the interrogator 26 must identify all devices 12 in the field (within communication range) such as by determining the identification numbers of the devices 12 in the field. After this is accomplished, point-to-point communication can proceed as s desired by the interrogator 26.

Generally speaking, RFID systems are a type of multi-access communication system. The distance between the interrogator 26 and devices 12 within the field is typically fairly short (e.g., several meters), so packet transmission time is determined primarily by packet size and baud rate. Propagation delays are negligible. In RFID systems, there is h1 a potential for a large number of transmitting devices 12 and there is a need for the interrogator 26 to work in a changing environment, where different devices 12 are swapped in and out frequently (e.g., as inventory is added or removed). In such systems, the inventors have determined that the use of random access methods work effectively for contention resolution (i.e., for dealing with collisions between devices 12 attempting to respond to the interrogator 26 at the same time).

RFID systems have some characteristics that are different from other communications systems. For example, one characteristic of the illustrated RFID systems is that the devices 12 never communicate without being prompted by the interrogator 26. This is in contrast to typical multiaccess systems where the transmitting units operate more independently. In addition, contention for the communication medium is short lived as compared to the ongoing nature of the problem in other multiaccess systems. For example, in a RFID system, after the devices 12 have been identified, the interrogator can communicate with them in a point-to-point fashion. Thus, arbitration in a RFID system is a transient rather than steady-state phenomenon. Further, the capability of a device 12 is limited by practical restrictions on size, power, and cost. The lifetime of a device 12 can often be measured in terms of number of transmissions before battery power is lost. Therefore, one of the most important measures of system performance in RFID arbitration is total time required to arbitrate a set of devices 12. Another measure is power consumed by the devices 12 during the process. This is in contrast to the measures of throughput and packet delay in other types of multiaccess systems.

FIG. 4 illustrates one arbitration scheme that can be employed for communication between the interrogator and devices 12. Generally, the interrogator 26 sends a command causing each device 12 of a potentially large number of responding devices 12 to select a random number from a known range and use it as that device's arbitration number. By transmitting requests for identification to various subsets of the full range of arbitration numbers, and checking for an error-free response, the interrogator 26 determines the arbitration number of every responder station capable of communicating at the same time. Therefore, the interrogator 26 is able to conduct subsequent uninterrupted communication with devices 12, one at a time, by addressing only one device 12.

Three variables are used: an arbitration value (AVALUE), an arbitration mask (AMASK), and a random value ID (RV). The interrogator sends an Identify command (IdentifyCmnd) causing each device of a potentially large number of responding devices to select a random number from a known range and use it as that device's arbitration number. The interrogator sends an arbitration value (AVALUE) and an arbitration mask (AMASK) to a set of devices 12. The receiving devices 12 evaluate the following equation: (AMASK & AVALUE)==(AMASK & RV) wherein "&" is a bitwise AND function, and wherein "==" is an equality function. If the equation evaluates to "1" (TRUE), then the device 12 will reply. If the equation evaluates to "0" (FALSE), then the device 12 will not reply. By performing this in a structured manner, with the number of bits in the arbitration mask being increased by one each time, eventually a device 12 will respond with no collisions. Thus, a binary search tree methodology is employed.

An example using actual numbers will now be provided using only four bits, for simplicity, reference being made to FIG. 4. In one embodiment, sixteen bits are used for AVALUE and AMASK. Other numbers of bits can also be employed depending, for example, on the number of devices 12 expected to be encountered in a particular application, on desired cost points, etc.

Assume, for this example, that there are two devices 12 in the field, one with a random value (RV) of 1100 (binary), and another with a random value (RV) of 1010 (binary). The interrogator is trying to establish communications without collisions being caused by the two devices 12 attempting to communicate at the same time.

The interrogator sets AVALUE to 0000 (or "don't care" for all bits, as indicated by the character "X" in FIG. 4) and AMASK to 0000. The interrogator transmits a command to all devices 12 requesting that they identify themselves. Each of the devices 12 evaluate (AMASK & AVALUE)==(AMASK & RV) using the random value RV that the respective devices 12 selected. If the equation evaluates to "1" (TRUE), then the device 12 will reply. If the equation evaluates to "0" (FALSE), then the device 12 will not reply. In the first level of the illustrated tree, AMASK is 0000 and anything bitwise ANDed with all zeros results in all zeros, so both the devices 12 in the field respond, and there is a collision.

Next, the interrogator sets AMASK to 0001 and AVALUE to 0000 and transmits an identify command. Both devices 12 in the field have a zero for their least significant bit, and (AMASK & AVALUE)==(AMASK & RV) will be true for both devices 12. For the device 12 with a random value of 1100, the left side of the equation is evaluated as follows (0001 & 0000)=0000. The right side is evaluated as (0001 & 1100)=0000. The left side equals the right side, so the equation is true for the device 12 with the random value of 1100. For the device 12 with a random value of 1010, the left side of the equation is evaluated as (0001 & 0000)=0000. The right side is evaluated as (0001 & 1010)=0000. The left side equals the right side, so the equation is true for the device 12 with the random value of 1010. Because the equation is true for both devices 12 in the field, both devices 12 in the field respond, and there is another collision.

Recursively, the interrogator next sets AMASK to 0011 with AVALUE still at 0000 and transmits an Identify command. (AMASK & AVALUE)==(AMASK & RV) is evaluated for both devices 12. For the device 12 with a random value of 1100, the left side of the equation is evaluated as follows (0011 & 0000)=0000. The right side is evaluated as (0011 & 1100)=0000. The left side equals the right side, so the equation is true for the device 12 with the random value of 1100, so this device 12 responds. For the device 12 with a random value of 1010, the left side of the equation is evaluated as (0011 & 0000)=0000. The right side is evaluated as (0011 & 1010)=0010. The left side does not equal the right side, so the equation is false for the device 12 with the random value of 1010, and this device 12 does not respond. Therefore, there is no collision, and the interrogator can determine the identity (e.g., an identification number) for the device 12 that does respond.

De-recursion takes place, and the devices 12 to the right for the same AMASK level are accessed when AVALUE is set at 0010, and AMASK is set to 0011.

The device 12 with the random value of 1010 receives a command and evaluates the equation (AMASK & AVALUE)==(AMASK & RV). The left side of the equation is evaluated as (0011 & 0010)=0010. The right side of the equation is evaluated as (0011 & 1010)=0010. The right side equals the left side, so the equation is true for the device 12 with the random value of 1010. Because there are no other devices 12 in the subtree, a good reply is returned by the device 12 with the random s value of 1010. There is no collision, and the interrogator can determine the identity (e.g., an identification number) for the device 12 that does respond.

By recursion, what is meant is that a function makes a call to itself. In other words, the function calls itself within the body of the function. After the called function returns, de-recursion takes place and execution continues at the place just after the function call; i.e. at the beginning of the statement after the function call.

For instance, consider a function that has four statements (numbered 1,2,3,4) in it, and the second statement is a recursive call. Assume that the fourth statement is a return statement. The first time through the loop (iteration 1) the function executes the statement 2 and (because it is a recursive call) calls itself causing iteration 2 to occur. When iteration 2 gets to statement 2, it calls itself making iteration 3. During execution in iteration 3 of statement 1, assume that the function does a return. The information that was saved on the stack from iteration 2 is loaded and the function resumes execution at statement 3 (in iteration 2), followed by the execution of statement 4 which is also a return statement. Since there are no more statements in the function, the function de-recurses to iteration 1. Iteration 1, had previously recursively called itself in statement 2. Therefore, it now executes statement 3 (in iteration 1). Following that it executes a return at statement 4. Recursion is known in the art.

Consider the following code which can be used to implement operation of the method shown in FIG. 4 and described above.

```
Arbitrate(AMASK, AVALUE)
  {
    collision=IdentityCmnd(AMASK, AVALUE)
    if (collision) then
      {
        /* recursive call for left side */
        Arbitrate((AMASK<<1)+1, AVALUE)
        /* recursive call for right side */
        Arbitrate((AMASK<<1)+1, AVALUE+(AMASK+1))
      } /* endif */
  }/* return */
```

The symbol "<<" represents a bitwise left shift. "<<1" means shift left by one place. Thus, 0001<<1 would be 0010. Note, however, that AMASK is originally called with a value of zero, and 0000<<1 is still 0000. Therefore, for the first recursive call, AMASK=(AMASK<<1)+1. So for the first recursive call, the value of AMASK is 0000+0001= 0001. For the second call, AMASK=(0001<<1)+1=0010+ 1=0011. For the third recursive call, AMASK=(0011<<1)+ 1=0110+1=0111.

The routine generates values for AMASK and AVALUE to be used by the interrogator in an identify command "IdentifyCmnd." Note that the routine calls itself if there is a collision. De-recursion occurs when there is no collision. AVALUE and AMASK would have values such as the following assuming collisions take place all the way down to the bottom of the tree.

| AVALUE | AMASK |
|---|---|
| 0000 | 0000 |
| 0000 | 0001 |
| 0000 | 0011 |
| 0000 | 0111 |
| 0000 | 1111* |
| 1000 | 1111* |
| 0100 | 0111 |
| 0100 | 1111* |
| 1100 | 1111* |

This sequence of AMASK, AVALUE binary numbers assumes that there are collisions all the way down to the bottom of the tree, at which point the Identify command sent by the interrogator is finally successful so that no collision occurs. Rows in the table for which the interrogator is successful in receiving a reply without collision are marked with the symbol "*". Note that if the Identify command was successful at, for example, the third line in the table then the interrogator would stop going down that branch of the tree and start down another, so the sequence would be as shown in the following table.

| AVALUE | AMASK |
|---|---|
| 0000 | 0000 |
| 0000 | 0001 |
| 0000 | 0011* |
| 0010 | 0011 |
| — | — |

This method is referred to as a splitting method. It works by splitting groups of colliding devices 12 into subsets that are resolved in turn. The splitting method can also be viewed as a type of tree search. Each split moves the method one level deeper in the tree.

Either depth-first or breadth-first traversals of the tree can be employed. Depth first traversals are performed by using recursion, as is employed in the code listed above. Breadth-first traversals are accomplished by using a queue instead of recursion. The following is an example of code for performing a breadth-first traversal.

```
Arbitrate(AMASK, AVALUE)
{
    enqueue(0,0)
    while (queue != empty)
        (AMASK,AVALUE) = dequeue( )
        collision=IdentifyCmmd(AMASK, AVALUE)
        if (collision) then
        }
            TEMP = AMASK+1
            NEW_AMASK = (AMASK<<1)+1
            enqueue(NEW_AMASK, AVALUE)
            enqueue(NEW_AMASK, AVALUE+TEMP)
        56    /* endif */
    endwhile
}/* return */
```

The symbol "!=" means not equal to. AVALUE and AMASK would have values such as those indicated in the following table for such ii code.

| AVALUE | AMASK |
|--------|-------|
| 0000   | 0000  |
| 0000   | 0001  |
| 0001   | 0001  |
| 0000   | 0011  |
| 0010   | 0011  |
| 0001   | 0011  |
| 0011   | 0011  |
| 0000   | 0111  |
| 0100   | 0111  |
| —      | —     |

Rows in the table for which the interrogator is successful in receiving a reply without collision are marked with the symbol "*".

FIG. 5 illustrates an embodiment wherein levels in the tree are skipped. The inventors have determined that skipping levels in the tree, after a collision caused by multiple devices 12 responding, reduces the number of subsequent collisions without adding significantly to the number of no replies. In real-time systems, it is desirable to have quick arbitration sessions on a set of devices 12 whose unique identification numbers are unknown. Level skipping reduces the number of collisions, both reducing arbitration time and conserving battery life on a set of devices 12.

Thus, FIG. 5 illustrates a binary search tree 32 being defined for a tree search method similar to the tree search method described in connection with FIG. 4. The tree 32 has multiple levels 34, 36, 38, 40, and 42 representing subgroups of the multiple devices 12. The number of devices in a subgroup in one level 34, 36, 38, 40, and 42 is half of the number of devices in the next higher level 34, 36, 38, 40, and 42. Although only five levels are shown, if more bits are employed, (e.g., sixteen bits or an integer multiple of eight or sixteen bits for each of AMASK and AVALUE), there will of course be more levels. The tree search method illustrated in FIG. 5 employs level skipping wherein at least one level of the tree is skipped.

A first predetermined number of bits, e.g. sixteen or an integer multiple of eight or sixteen bits, are established to be used as unique identification numbers. Respective devices 12 are provided with unique identification numbers respectively having the first predetermined number of bits, in addition to their random values RV. For example, such unique identification numbers are stored in memory in the respective devices 12.

A second predetermined number of bits are established to be used for the random values RV. The devices 12 are caused to select random values, RV. This is done, for example, by the interrogator 26 sending an appropriate command. Respective devices choose random values independently of random values selected by the other devices 12. Random number generators are known in the art.

The interrogator transmits a command requesting devices 12 having random values RV within a specified group of random values to respond, a1 using a methodology similar to that described in connection with FIG. 4, except that levels are skipped. Four subsets of random values, instead of two, are probed when moving down the tree and skipping a level. This means that instead of eliminating half of the remaining devices 12 and re-trying, after a collision, the interrogator eliminates three quarters of the remaining devices 12 and re-tries (by sending a command). In other words, a new specified group is created that is one quarter of the set of random values of the previous group.

Each devices 12 that receives the command determines if its chosen random value falls within the specified group by evaluating the equation (AMASK & AVALUE)==(AMASK & RV) and, if so, sends a reply to the interrogator. The reply includes the random value of the replying device 12 and the unique identification number of the device 12. The interrogator determines if a collision occurred between devices that sent a reply and, if so, creates a new, smaller, specified group, by moving down the tree, skipping a level.

In the illustrated embodiment, every other level is skipped. In alternative embodiments, more than one level is skipped each time.

The trade off that must be considered in determining how many (if any) levels to skip with each decent down the tree is as follows. Skipping levels reduces the number of collisions, thus saving battery power in the devices 12. Skipping deeper (skipping more than one level) further reduces the number of collisions. The more levels that are skipped, the greater the reduction in collisions. However, skipping levels results in longer search times because the number of queries (Identify commands) increases. The more levels that are skipped, the longer the search times. The inventors have determined that skipping just one level has an almost negligible effect on search time, but drastically reduces the number of collisions. If more than one level is skipped, search time increases substantially.

The inventors have determined that skipping every other level drastically reduces the number of collisions and saves battery power without significantly increasing the number of queries.

After receiving a reply without collision from a device 12, the interrogator 26 can send a command individually addressed to that device by using its now known random value or its now known unique identification number.

The above described code for depth-first traversal is modified to provide for level skipping by increasing the number of recursive calls as shown below. For example, the above described code for depth-first traversal is replaced with code such as the following to provide for depth-first traversal employing level skipping.

```
Arbitrate(AMASK, AVALUE)
  {
    collision=IdentityCmmd(AMASK, AVALUE)
    if (collision) then
      {
        TEMP = AMASK+1
        NEW_AMASK = (AMASK<<2)+3
        Arbitrate(NEW_AMASK, AVALUE)
        Arbitrate(NEW_AMASK, AVALUE+TEMP)
        Arbitrate(NEW_AMASK, AVALUE+2*TEMP)
        Arbitrate(NEW_AMASK, AVALUE+3*TEMP)
      }  /* endif */
  }/* return */
```

AVALUE and AMASK would have values such as those indicated in the following table for such code.

| AVALUE | AMASK |
|--------|-------|
| 0000   | 0000  |
| 0000   | 0011  |
| 0000   | 1111* |
| 0100   | 1111* |
| 1000   | 1111* |
| 1100   | 1111* |
| 0001   | 0011  |
| 0001   | 1111* |
| 0101   | 1111* |
| 1001   | 1111* |
| 1101   | 1111* |
| 0010   | 0011  |
| 0010   | 1111* |
| 0110   | 1111* |
| 1010   | 1111* |
| 1110   | 1111* |
| —      | —     |

Rows in the table for which the interrogator is successful in receiving a reply without collision are marked with the symbol "*".

Similarly, the code provided above for breadth-first traversal can be readily modified to employ level skipping. Instead of inserting two items into the queue each time through the loop, four items are inserted into the queue each time through the loop. For either breadth-first traversal or depth-first traversal, AMASK will be shifted by two bits instead of one, and AVALUE will take on twice as many different values as in the case where level skipping is not employed.

Another arbitration method that can be employed is referred to as the "Aloha" method. In the Aloha method, every time a device 12 is involved in a collision, it waits a random period of time before retransmitting. This method can be improved by dividing time into equally sized slots and forcing transmissions to be aligned with one of these slots. This is referred to as "slotted Aloha." In operation, the interrogator asks all devices 12 in the field to transmit their identification numbers in the next time slot. If the response is garbled, the interrogator informs the devices 12 that a collision has occurred, and the slotted Aloha scheme is put into action. This means that each device 12 in the field responds within an arbitrary slot determined by a randomly selected value. In other words, in each successive time slot, the devices 12 decide to transmit their identification number with a certain probability.

The Aloha method is based on a system operated by the University of Hawaii. In 1971, the University of Hawaii began operation of a system named Aloha. A communication satellite was used to interconnect several university computers by use of a random access protocol. The system operates as follows. Users or devices transmit at any time they desire. After transmitting, a user listens for an acknowledgment from the receiver or interrogator. Transmissions from different users will sometimes overlap in time (collide), causing reception errors in the data in each of the contending messages. The errors are detected by the receiver, and the receiver sends a negative acknowledgment to the users. When a negative acknowledgment is received, the messages are retransmitted by the colliding users after a random delay. If the colliding users attempted to retransmit without the random delay, they would collide again. If the user does not receive either an acknowledgment or a negative acknowledgment within a certain amount of time, the user "times out" and retransmits the message.

There is a scheme known as slotted Aloha which improves the Aloha scheme by requiring a small amount of coordination among stations. In the slotted Aloha scheme, a sequence of coordination pulses is broadcast to all stations (devices). As is the case with the pure Aloha scheme, packet lengths are constant. Messages are required to be sent in a slot time between synchronization pulses, and can be started only at the beginning of a time slot. This reduces the rate of collisions because only messages transmitted in the same slot can interfere with one another. The retransmission mode of the pure Aloha scheme is modified for slotted Aloha such that if a negative acknowledgment occurs, the device retransmits after a random delay of an integer number of slot times.

Aloha methods are described in a commonly assigned patent application (attorney docket number MI40-089) naming Clifton W. Wood, Jr. as an inventor, titled "Method of Addressing Messages and Communications System," filed concurrently herewith, and incorporated herein by reference.

In one alternative embodiment, an Aloha method is combined with level skipping, such as the level skipping shown and described in connection with FIG. 5. For example, in one embodiment, devices 12 sending a reply to the interrogator 26 do so within a randomly selected time slot of a number of slots.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of establishing wireless communications between an interrogator and individual ones of multiple wireless identification devices, the method comprising utilizing a tree search method to establish communications without collision between the interrogator and individual ones of the multiple wireless identification devices, a search tree being defined for the tree search method, the tree having multiple levels representing subgroups of the multiple wireless identification devices, the number of devices in a subgroup in one level being half of the number of devices in the next higher level, the tree search method employing level skipping wherein at least one level of the tree is skipped.

2. A method in accordance with claim 1 wherein the wireless identification device comprises an integrated circuit including a receiver, a modulator, and a microprocessor in communication with the receiver and modulator.

3. A method of addressing messages from an interrogator to a selected one or more of a number of communications devices, the method comprising:

establishing a first predetermined number of bits to be used as unique identification numbers, and establishing for respective devices unique identification numbers respectively having the first predetermined number of bits;

establishing a second predetermined number of bits to be used for random values;

causing the devices to select random values, wherein respective devices choose random values independently of random values selected by the other devices;

transmitting a command from the interrogator requesting devices having random values within a specified group of random values to respond;

receiving the command at multiple devices, devices receiving the command respectively determining if the random value chosen by the device falls within the specified group and, if so, sending a reply to the interrogator; and determining using the interrogator if a collision occurred between devices that sent a reply and, if so, creating a new, smaller, specified group that is one quarter of the first mentioned specified group.

4. A method of addressing messages from an interrogator to a selected one or more of a number of communications devices in accordance with claim 3 wherein sending a reply to the interrogator comprises transmitting the unique identification number of the device sending the reply.

5. A method of addressing messages from an interrogator to a selected one or more of a number of communications devices in accordance with claim 3 wherein sending a reply to the interrogator comprises transmitting the random value of the device sending the reply.

6. A method of addressing messages from an interrogator to a selected one or more of a number of communications devices in accordance with claim 3 wherein sending a reply to the interrogator comprises transmitting both the random value of the device sending the reply and the unique identification number of the device sending the reply.

7. A method of addressing messages from an interrogator to a selected one or more of a number of communications devices in accordance with claim 3 wherein, after receiving a reply without collision from a device, the interrogator sends a command individually addressed to that device.

8. A method of addressing messages from an interrogator to a selected one or more of a number of communications devices, the method comprising:

establishing unique identification numbers for respective devices;

causing the devices to select random values, wherein respective devices choose random values independently of random values selected by the other devices;

the interrogator transmitting a command requesting devices having random values within a specified group of a plurality of possible groups of random values to respond, the specified group being less than or equal to the entire set of random values, the plurality of possible groups being organized in a binary tree having a plurality of levels, wherein groups of random values decrease in size by half with each level descended;

devices receiving the command respectively determining if the random value chosen by the device falls within the specified group and, if so, sending a reply to the interrogator; and, if not, not sending a reply; and determining using the interrogator if a collision occurred between devices that sent a reply and, if so, creating a new, smaller, specified group by descending at least two levels in the tree.

9. A method of addressing messages from an interrogator to a selected one or more of a number of communications devices in accordance with claim 8 wherein establishing unique identification numbers for respective devices comprises establishing a predetermined number of bits to be used for the unique identification numbers.

10. A method of addressing messages from an interrogator to a selected one or more of a number of communications devices in accordance with claim 9 and further including establishing a predetermined number of bits to be used for the random values.

11. A method of addressing messages from an interrogator to a selected one or more of a number of communications devices in accordance with claim 10 wherein the predetermined number of bits to be used for the random values comprises sixteen bits.

12. A method of addressing messages from an interrogator to a selected one or more of a number of communications devices in accordance with claim 10 wherein devices sending a reply to the interrogator do so within a randomly selected time slot of a number of slots.

13. A method of addressing messages from an interrogator to a selected one or more of a number of RFID devices, the method comprising:

establishing for respective devices unique identification numbers respectively having a first predetermined number of bits, the first predetermined number being a multiple of sixteen;

establishing a second predetermined number of bits to be used for random values, the second predetermined number being a multiple of sixteen;

causing the devices to select random values, wherein respective devices choose random values independently of random values selected by the other devices;

transmitting from the interrogator a command requesting devices having random values within a specified group of a plurality of possible groups of random values to respond, the specified group being less than or equal to the entire set of random values, the plurality of possible groups being organized in a binary tree having a plurality of levels, wherein groups of random values decrease in size by half with each level;

receiving the command at multiple of the devices, the devices receiving the command respectively determining if the random value chosen by the device falls within the specified group and, only if so, sending a reply to the interrogator, wherein sending a reply to the interrogator comprises transmitting both the random value of the device sending the reply and the unique identification number of the device sending the reply;

determining using the interrogator if a collision occurred between devices that sent a reply and, if so, creating a new, smaller, specified group using a level of the tree different from the level used in the interrogator transmitting, wherein at least one level of the tree is skipped, the interrogator transmitting a command requesting devices having random values within the new specified group of random values to respond; and if a reply without collision is received from a device, the interrogator subsequently sending a command individually addressed to that device.

14. A method of addressing messages from an interrogator to a selected one or more of a number of RFID devices in accordance with claim 13 wherein exactly one level is skipped.

15. A method of addressing messages from an interrogator to a selected one or more of a number of RFID devices in accordance with claim 13 wherein the first predetermined number of bits is sixteen.

16. A method of addressing messages from an interrogator to a selected one or more of a number of RFID devices in accordance with claim 13 wherein the first predetermined number of bits is sixteen and the second predetermined number of bits is sixteen.

17. A method of addressing messages from an interrogator to a selected one or more of a number of RFID devices in accordance with claim 13 and further comprising, after the interrogator transmits a command requesting devices having random values within the new specified group of random values to respond:

devices receiving the command respectively determining if their chosen random values fall within the new smaller specified group and, if so, sending a reply to the interrogator.

18. A method of addressing messages from an interrogator to a selected one or more of a number of RFID devices in accordance with claim 17 and further comprising, after the interrogator transmits a command requesting devices having random values within the new specified group of random values to respond:

determining if a collision occurred between devices that sent a reply and, if so, creating a new specified group and repeating the transmitting of the command requesting devices having random values within a specified group of random values to respond using different specified groups until all of the devices within communications range are identified.

19. A communications system comprising an interrogator, and a plurality of wireless identification devices configured to communicate with the interrogator in a wireless fashion, the respective wireless identification devices having a unique identification number, the interrogator being configured to employ a tree search technique to determine the unique identification numbers of the different wireless identification devices so as to be able to establish communications between the interrogator and individual ones of the multiple wireless identification devices without collision by multiple wireless identification devices attempting to respond to the interrogator at the same time, wherein levels of the tree are skipped in some instances.

20. A communications system in accordance with claim 19 wherein the tree search technique is a binary tree search technique.

21. A communications system in accordance with claim 19 wherein the wireless identification device comprises an integrated circuit including a receiver, a modulator, and a microprocessor in communication with the receiver and modulator.

22. A system comprising:
an interrogator;
a number of communications devices capable of wireless communications with the interrogator;
means for establishing a first predetermined number of bits to be used as unique identification numbers, and for establishing for respective devices unique identification numbers respectively having the first predetermined number of bits;
means for establishing a second predetermined number of bits to be used for random values; means for causing the devices to select random values, wherein respective devices choose random values independently of random values selected by the other devices;
means for causing the interrogator to transmit a command requesting devices having random values within a specified group of random values to respond;
means for causing devices receiving the command to determine if their chosen random values fall within the specified group and, if so, send a reply to the interrogator; and
means for causing the interrogator to determine if a collision occurred between devices that sent a reply and, if so, create a new, smaller, specified group that is one quarter of the first mentioned specified group.

23. A system in accordance with claim 22 wherein sending a reply to the interrogator comprises transmitting the unique identification number of the device sending the reply.

24. A system in accordance with claim 22 wherein sending a reply to the interrogator comprises transmitting the random value of the device sending the reply.

25. A system in accordance with claim 22 wherein sending a reply to the interrogator comprises transmitting both the random value of the device sending the reply and the unique identification number of the device sending the reply.

26. A system in accordance with claim 22 wherein the interrogator further includes means for, after receiving a reply without collision from a device, sending a command individually addressed to that device.

27. A system comprising:
an interrogator configured to communicate to a selected one or more of a number of communications devices;
a plurality of communications devices;
the devices being configured to select random values, wherein respective devices choose random values independently of random values selected by the other devices;
the interrogator being configured to transmit a command requesting devices having random values within a specified group of a plurality of possible groups of random values to respond, the specified group being less than or equal to the entire set of random values, the plurality of possible groups being organized in a binary tree having a plurality of levels, wherein groups of random values decrease in size by half with each level descended;
devices receiving the command being configured to respectively determine if their chosen random values fall within the specified group and, if so, send a reply to the interrogator; and, if not, not send a reply; and
the interrogator being configured to determine if a collision occurred between devices that sent a reply and, if so, create a new, smaller, specified group by descending at least two levels in the tree.

28. A system in accordance with claim 27 wherein the random values have a predetermined number of bits.

29. A system in accordance with claim 27 wherein respective devices are configured to store unique identification numbers of a predetermined number of bits.

30. A system in accordance with claim 27 wherein respective devices are configured to store unique identification numbers of sixteen bits.

31. A system comprising:
an interrogator configured to communicate to a selected one or more of a number of RFID devices;

a plurality of RFID devices, respective devices being configured to store unique identification numbers respectively having a first predetermined number of bits, the first predetermined number being an integer multiple of sixteen, respective devices being further configured to store a second predetermined number of bits to be used for random values, the second predetermined number being an integer multiple of sixteen, respective devices being configured to select random values independently of random values selected by the other devices;

the interrogator being configured to transmit an identify command requesting devices having random values within a specified group of random values to respond, the specified group being less than or equal to the entire set of random values;

devices receiving the command respectively being configured to determine if their chosen random values fall within the specified group and, only if so, send a reply to the interrogator, wherein sending a reply to the interrogator comprises transmitting both the random value of the device sending the reply and the unique identification number of the device sending the reply;

the interrogator being configured to determine if a collision occurred between devices that sent a reply and, if so, create a new, smaller, specified group using a level of the tree different from the level used in previously transmitting an identify command, wherein at least one level of the tree is skipped, the interrogator transmitting an identify command requesting devices having random values within the new specified group of random values to respond; and the interrogator being configured to send a command individually addressed to a device after communicating with a device without a collision.

32. A system in accordance with claim 31 wherein the interrogator is configured to skip exactly one level when creating the new, smaller, specified group.

33. A system in accordance with claim 31 wherein the number of possible time slots is four, wherein the first predetermined number of bits is sixteen.

34. A system in accordance with claim 31 wherein the number of possible time slots is four, wherein the first predetermined number of bits is sixteen, and wherein the second predetermined number of bits is sixteen.

35. A system in accordance with claim 31 wherein the devices are configured to respectively determine if their chosen random values fall within a specified group and, if so, send a reply, upon receiving respective identify commands.

36. A system in accordance with claim 35 wherein the interrogator is configured to determine if a collision occurred between devices that sent a reply in response to respective identify commands and, if so, create further new specified groups and repeat the transmitting of the identify command requesting devices having random values within a specified group of random values to respond using different specified groups until all responding devices are identified.

* * * * *

UNITED STATES PATENT AND TRADEMARK OFFICE
CERTIFICATE OF CORRECTION

PATENT NO. : 6,072,801
DATED : June 6, 2000
INVENTOR(S) : Clifton W. Wood, Jr. and Don Hush It is certified that error appears in the above-identified patent and that said Letters Patent is hereby corrected as shown below:

Column 2,
Line 29, replace "to s conduct" with --to conduct--.

Column 4,
Line 21, replace "there i will be" with --there will be--.

Column 5,
Line 25, replace "as s desired" with --as desired--.
Line 32, delete "h1".

Column 7,
Line 35, replace "with the random s value" with --with the random value--.

Column 9,
Line 19, replace "56 /* endif */" with -- /* endif */--.
Line 25, replace "for such ii code." with --for such code.--.

Column 10,
Line 16, delete "a1".

Signed and Sealed this

Thirty-first Day of July, 2001

*Attest:*

NICHOLAS P. GODICI
*Attesting Officer*    Acting Director of the United States Patent and Trademark Office